(12) United States Patent
Naik et al.

(10) Patent No.: US 10,873,535 B2
(45) Date of Patent: Dec. 22, 2020

(54) METHOD AND APPARATUS FOR AVOIDING PACKET FRAGMENTATION IN MOBILE COMMUNICATIONS

(71) Applicant: MediaTek Inc., Hsinchu (TW)

(72) Inventors: Rohit Naik, Hsinchu (TW); Chien-Chun Huang-Fu, Hsinchu (TW); Sami Jutila, Dulu (FI)

(73) Assignee: MediaTek Inc.

( * ) Notice: Subject to any disclaimer, the term of this patent is extended or adjusted under 35 U.S.C. 154(b) by 11 days.

(21) Appl. No.: 16/039,572

(22) Filed: Jul. 19, 2018

(65) Prior Publication Data
US 2019/0052572 A1    Feb. 14, 2019

Related U.S. Application Data

(60) Provisional application No. 62/543,405, filed on Aug. 10, 2017.

(51) Int. Cl.
| | |
|---|---|
| *H04L 12/805* | (2013.01) |
| *H04W 76/12* | (2018.01) |
| *H04W 24/02* | (2009.01) |

(52) U.S. Cl.
CPC ............ *H04L 47/36* (2013.01); *H04W 24/02* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 2015/0181459 A1* | 6/2015 | Zhu | H04L 65/80 370/236 |
| 2015/0256654 A1 | 9/2015 | Oguchi | |
| 2017/0339258 A1* | 11/2017 | Momchilov | H04L 69/18 |

FOREIGN PATENT DOCUMENTS

| | | | | |
|---|---|---|---|---|
| CN | 102833750 | * | 12/2012 | ............ H04W 12/06 |
| CN | 102833750 A | | 12/2012 | |

OTHER PUBLICATIONS

Taiwan Intellectual Property Office, Office Action for Taiwan Patent Application No. 107125704, dated Jun. 28, 2019.
Vodafone, MTU for non-IP PDN connection, SA WG2 Meeting #114 S2-162062, Apr. 11-15, 2016.

* cited by examiner

*Primary Examiner* — Kouroush Mohebbi
(74) *Attorney, Agent, or Firm* — Han IP PLLC; Andy M. Han (57) ABSTRACT

Various solutions for avoiding packet fragmentation with respect to user equipment and network apparatus in mobile communications are described. An apparatus may determine a first maximum transmission unit (MTU) configuration of a session via a first network interface. The apparatus may determine a second MTU configuration of the session via a second network interface. The apparatus may determine a tunnel overhead size between the second network interface and the first network interface. The apparatus may select a transport protocol to generate a packet according to the second MTU configuration and the tunnel overhead size. The apparatus may transmit the packet via the second network interface.

20 Claims, 7 Drawing Sheets

METHOD AND APPARATUS FOR AVOIDING PACKET FRAGMENTATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/543,405, filed on 10 Aug. 2017, the content of which is incorporated by reference in its entirety.

TECHNICAL FIELD

The present disclosure is generally related to mobile communications and, more particularly, to avoiding packet fragmentation with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or a $3^{rd}$ Generation Partnership Project (3GPP) wireless communication system, a user equipment (UE) may be capable of transmitting a packet over a non-3GPP access. The non-3GPP access may be a wireless local area network (WLAN) or a wireless fidelity (Wi-Fi) network.

In the practical deployment scenario, a lot of call drops may happen when the call is handed over to the non-3GPP network. The major reason for the call drops may be the packet loss due to packet fragmentation. The UE may fragment the packet into multiple packet fragments and transmit the packet fragments over the non-3GPP access. However, the network element of the non-3GPP network may not support IP fragmentation and may drop the fragmented IP packets. For example, the network element may not support delivery of the IP fragment, or may not support IP fragmentation. This may lead to serious call drop and bad user experience.

Accordingly, how to reduce the call drop rate and improve the user experience may be an important issue when conducting a call over the non-3GPP network. It is needed to provide proper design for avoiding packet fragmentation when transmitting packets over the non-3GPP network.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to avoiding packet fragmentation with respect to user equipment and network apparatus in mobile communications.

In one aspect, a method may involve an apparatus determining a first maximum transmission unit (MTU) configuration of a session via a first network interface. The method may also involve the apparatus determining a second MTU configuration of the session via a second network interface. The method may further involve the apparatus determining a tunnel overhead size between the second network interface and the first network interface. The method may further involve the apparatus selecting a transport protocol to generate a packet according to the second MTU configuration and the tunnel overhead size. The method may further involve the apparatus transmitting the packet via the second network interface.

In one aspect, an apparatus may comprise a transceiver capable of wirelessly communicating with a plurality of nodes of a wireless network. The apparatus may also comprise a processor communicatively coupled to the transceiver. The processor may be capable of determining a first MTU configuration of a session via a first network interface. The processor may also be capable of determining a second MTU configuration of the session via a second network interface. The processor may further be capable of determining a tunnel overhead size between the second network interface and the first network interface. The processor may further be capable of selecting a transport protocol to generate a packet according to the second MTU configuration and the tunnel overhead size. The processor may further be capable of transmitting the packet via the second network interface.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to avoiding packet fragmentation with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
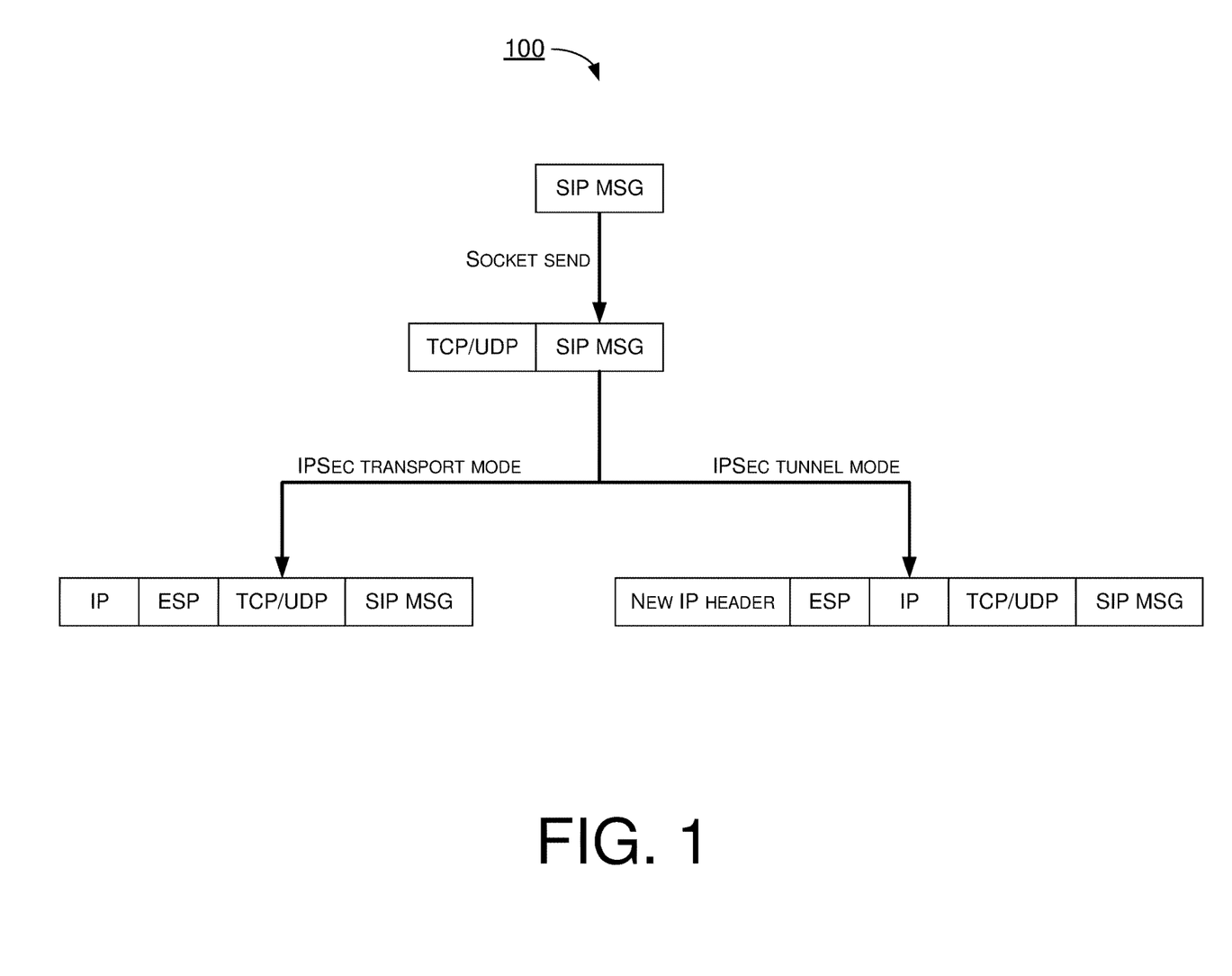
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE or a user agent (UA) and a plurality of nodes, which may be a part of a communication network. The communication network may comprise a 3GPP network and/or a non-3GPP network. The 3GPP network may comprise, for example and without limitation, an LTE network, an LTE-Advanced network, an LTE-Advanced Pro network, a 5G network, an NR network, an IoT network or an NB-IoT network. The non-3GPP network may comprise, for example and without limitation, a WLAN or a Wi-Fi network. The UE may be configured to wirelessly communicate with the 3GPP network or the non-3GPP network.

As shown in FIG. 1, the UE may be configured to transmit (e.g., socket send) a session initiation protocol (SIP) message (e.g., SIP MSG). The SIP is a session based protocol and consist of request/response messages. The response message may be used as an acknowledgement for the request message. In a case that the response message is not received, the request message may be re-transmitted. In order to transmit the SIP message, a transport type or transport protocol may be selected according to a predetermined rule. The transport type or transport protocol may comprise, for example and without limitation, a transmission control protocol (TCP), a user datagram protocol (UDP) or a stream control transmission protocol (SCTP). For example, in a case that a request message is within 200 bytes of the path MTU, or in a case that it is larger than 1300 bytes and the path MTU is unknown, the request message must be sent using a congestion controlled transport protocol such as TCP. After determining the transport protocol, the UE may be configured to add the transport protocol type (e.g., TCP/UDP) in SIP header of the SIP message.

The UE may be configured to transmit the SIP message via the 3GPP network interface (e.g., LTE interface) or the non-3GPP network interface (e.g., WLAN interface). In a case that the SIP message is transmitted via the 3GPP network interface, the UE may be configured to use an internet protocol security (IPsec) transport mode to transmit the SIP message. In a case that the SIP message is transmitted via the non-3GPP network interface, the UE may be configured to use an IPsec tunnel mode to transmit the SIP message.

In the IPsec transport mode, the UE may be configured to add an encapsulating security payload (ESP) encryption header and an IP address header to the SIP message. In the IPsec tunnel mode, the entire IP packet may be used as a payload. The UE may be configured to further add a new IP header and an ESP encryption header to the IP packet. The new IP header and the ESP encryption header may be used for transmitting via the non-3GPP network interface.

However, in the practical deployment scenario, a lot of call drops may happen when the call is handed over to the non-3GPP network. The major reason for the call drops may be the packet loss due to IP fragmentation. When an LTE packet is transmitted over the non-3GPP network interface, the IPSec tunneling overhead may increase the packet size. In some scenarios, the final packet size including the IPSec tunneling overhead may exceed the path MTU of the non-3GPP network interface. Such scenarios may lead to IP fragmentation either in an access point (AP) or in the non-3GPP network. The Wi-Fi AP and the non-3GPP network may not support IP fragmentation and may drop the fragmented IP packets. For example, the Wi-Fi AP may not support delivery of the IP fragment, or may not support IP fragmentation. The network elements or nodes of the non-3GPP network also drop the packets due to no support for IP fragmentation. Accordingly, such behaviors may lead to serious call drop and bad user experience.

Figure 2:
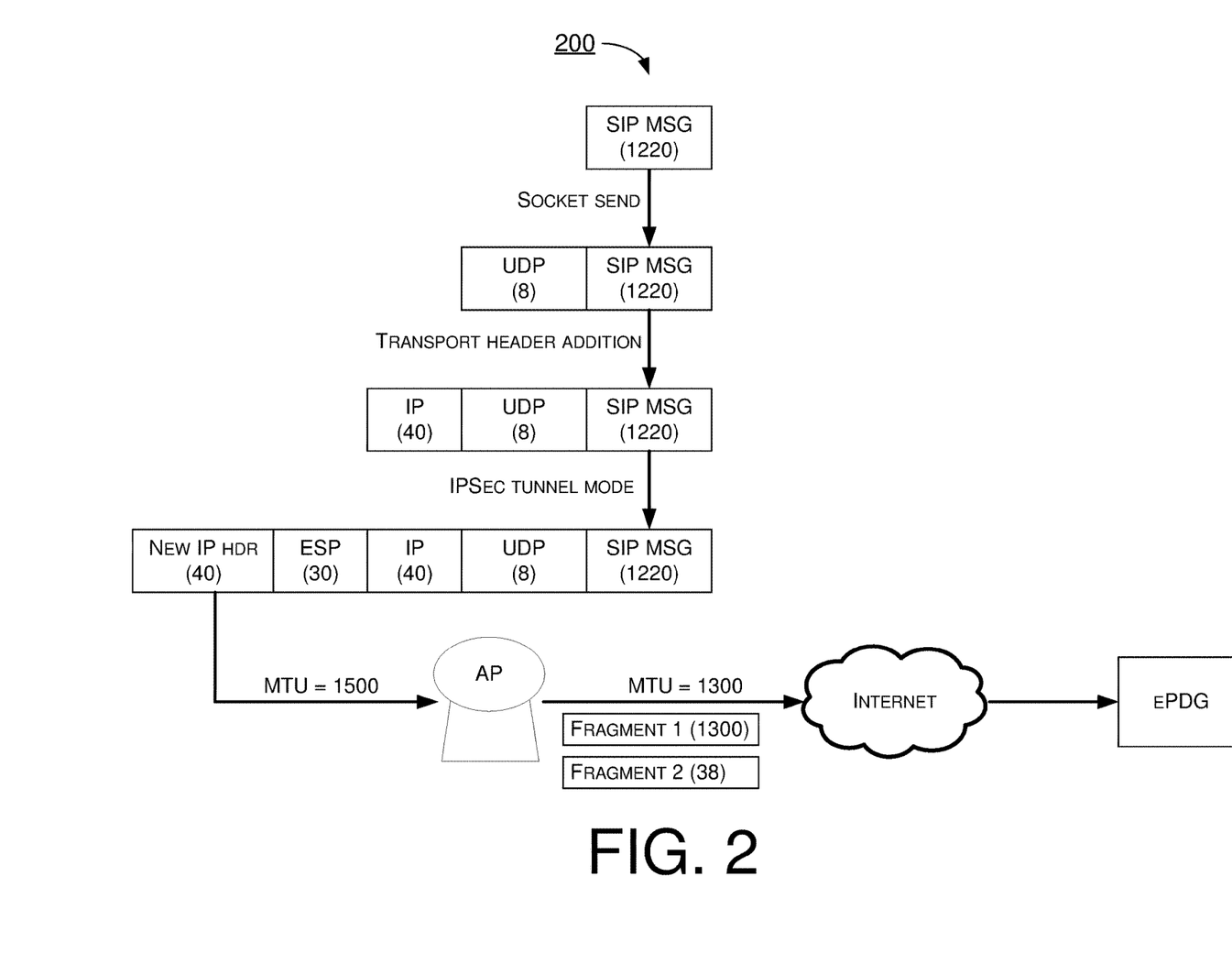
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE or UA and a plurality of nodes, which may be a part of a communication network. The UE may be able to wirelessly communicate with a communication network. The communication network may comprise a 3GPP network (e.g., LTE network) and/or a non-3GPP network (e.g., Wi-Fi network). The UE may be configured to transmit a SIP message (e.g., SIP MSG) through the LTE network interface and the Wi-Fi network interface sequentially. In scenario 200, the MTU configuration of the LTE network interface may be assumed to be 1428 bytes. The MTU configuration of the Wi-Fi network interface may be assumed to be 1500 bytes. The UE may be configured to determine the transport protocol according to the MTU configuration of the LTE network interface.

For example, the UE may be configured to send a SIP message with a size of 1220 bytes. Since the packet size is 208 bytes less than the LTE MTU configuration (e.g., 1428−1220=208), the UE may be configured to select the UDP for transmitting the SIP message according to the predetermined rule. The UE may be configured to add the transport type (e.g., 8 bytes) to the Via header of the SIP message. The Via header may comprise, for example and without limitation, the protocol name (e.g., SIP), protocol version, transport type (e.g., UDP or TCP), IP address of the UE and the protocol port used for the SIP message. The UE may also add the IP address (e.g., 40 bytes) to the Via header of the SIP message. The packet size after the IP and transport overhead may be 1268 bytes (e.g., 1220+8+40=1268) which is less than the LTE MTU configuration (e.g., 1428). Therefore, in a case that the packet is transmitted over LTE network interface, there would be no IP fragmentation.

However, since the packet may be finally transmitted over the Wi-Fi network interface by using the IPSec tunnel mode, the final packet may further comprise the IPSec tunnel overhead and may be subjected to the path MTU configuration of the Wi-Fi network interface. For example, the extra IPSec tunnel overhead may comprise an ESP encryption header (e.g., 30 bytes) and a new IP header (e.g., 40 bytes). The ESP encryption header is the security header used for encryption when transmitting in an insecure interface/network. The new IP header is the IP address through the Wi-Fi network interface. Accordingly, the extra IPSec tunnel overhead may increase the total packet size to 1338 bytes (e.g., 1268+30+40=1338). Since the path MTU configuration of the Wi-Fi network interface is 1500 bytes, the UE may be configured to transmit the packet to the Wi-Fi AP as a single IP packet.

In some implementations, the MTU configurations may be variant along the path. For example, the MTU configuration may be 1500 bytes between the UE and the AP. The MTU configuration may become 1300 bytes between the AP and the network element of the internet. In such scenario, since the total packet size (e.g., 1338 bytes) is greater than the MTU configuration between the AP and the network element, the packet may be fragmented at the AP. For example, the packet may be fragmented into a first fragmented packet (e.g., 1300 bytes) and a second fragmented packet (e.g., 38 bytes).

However, in some implementations, the AP may not support IP fragmentation. For example, the AP may not perform IP fragmentation. In a case that the packet size is greater than the path MTU, the AP may directly drop the packet. In another example, the AP may not support delivery of IP fragments. In a case that the AP receives the IP fragments, the AP may drop the IP fragments. In the transmission path, some network elements may also not support IP fragmentation. The network element may drop the packet due to no support for IP fragmentation or no support for delivery of IP fragments. Since the UE may continuously use the same Wi-Fi network interface, the re-transmitted IP packets or SIP messages may keep being dropped. Such situation may lead to serious call drop and bad user experience. In some implementations, in a case that the fragments are received out of order at the terminating side, the terminating side may not be able to assemble the fragments correctly that may also lead to call drop problems.

Figure 3:
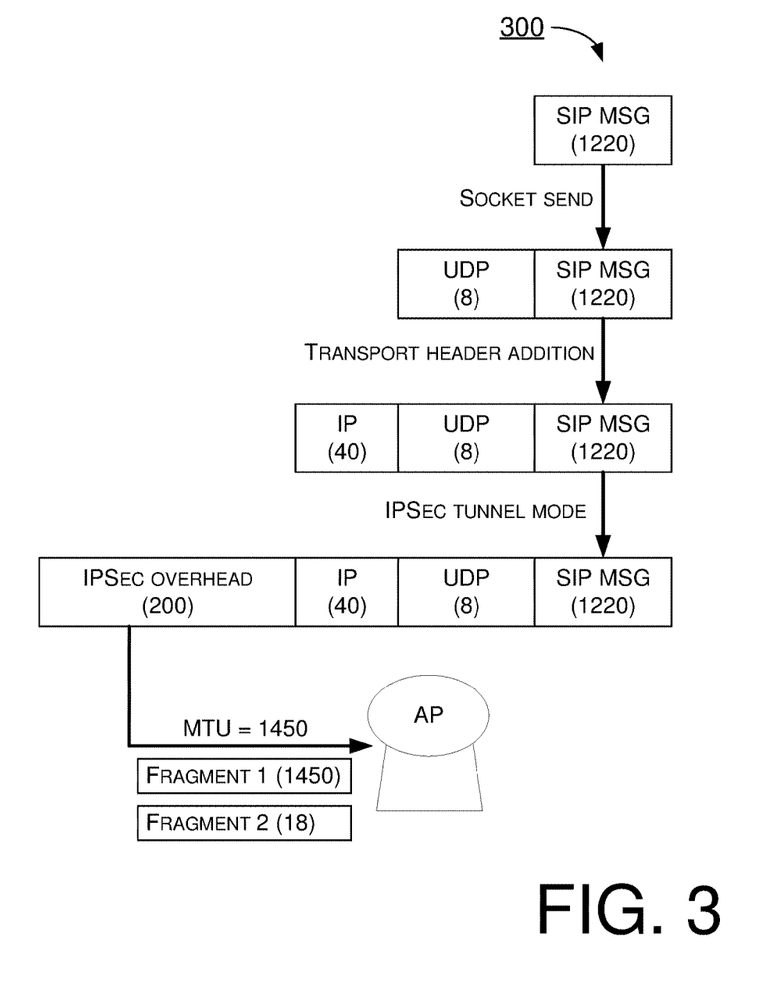
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE or UA and a plurality of nodes, which may be a part of a communication network. The UE may be able to wirelessly communicate with a communication network. The communication network may comprise a 3GPP network (e.g., LTE network) and/or a non-3GPP network (e.g., Wi-Fi network). The UE may be configured to transmit a SIP message (e.g., SIP MSG) through the LTE network interface and the Wi-Fi network interface sequentially. In scenario 300, the MTU configuration of the LTE network interface may be assumed to be 1428 bytes. The MTU configuration of the Wi-Fi network interface may be assumed to be 1450 bytes. The UE may be configured to determine the transport protocol according to the MTU configuration of the LTE network interface.

For example, the UE may be configured to send a SIP message with a size of 1220 bytes. Since the packet size is 208 bytes less than the LTE MTU configuration (e.g., 1428−1220=208), the UE may be configured to select the UDP for transmitting the SIP message according to the predetermined rule. The UE may be configured to add the transport type (e.g., 8 bytes) to the Via header of the SIP message. The Via header may comprise, for example and without limitation, the protocol name (e.g., SIP), protocol version, transport type (e.g., UDP or TCP), IP address of the UE and the protocol port used for the SIP message. The UE may also add the IP address (e.g., 40 bytes) to the Via header of the SIP message. The packet size after the IP and transport overhead may be 1268 bytes (e.g., 1220+8+40=1268) which is less than the LTE MTU configuration (e.g., 1428). Therefore, in a case that the packet is transmitted over LTE network interface, there would be no IP fragmentation.

However, since the packet may be finally transmitted over the Wi-Fi network interface by using the IPSec tunnel mode, the final packet may further comprise the IPSec tunnel overhead and may be subjected to the path MTU configuration of the Wi-Fi network interface. For example, the extra IPSec tunnel overhead may comprise a plurality headers added through multiple IPSec tunnels. The overall IPSec tunnel overhead may be added to 200 bytes. Accordingly, the extra IPSec tunnel overhead may increase the total packet size to 1468 bytes (e.g., 1268+200=1468). Since the path MTU configuration of the Wi-Fi network interface is 1450 bytes in this example, the UE may be configured to fragment the packet and transmit the packet to the Wi-Fi AP as two IP packets (e.g., a first IP fragment and a second IP fragment).

Similarly, in some implementations, the AP may not support IP fragmentation. For example, the AP may not support delivery of IP fragments. In a case that the AP receives the IP fragments, the AP may drop the second IP fragment. In the transmission path, some network elements may also not support IP fragmentation. The network element may drop the second IP fragment due to no support for IP fragmentation or no support for delivery of IP fragments. Since the UE may continuously use the same Wi-Fi network interface, the re-transmitted IP packets or SIP messages may keep being dropped. Such situation may lead to serious call drop and bad user experience. In some implementations, in a case that the fragments are received out of order at the terminating side, the terminating side may not be able to assemble the fragments correctly that may also lead to call drop problems.

Figure 4:
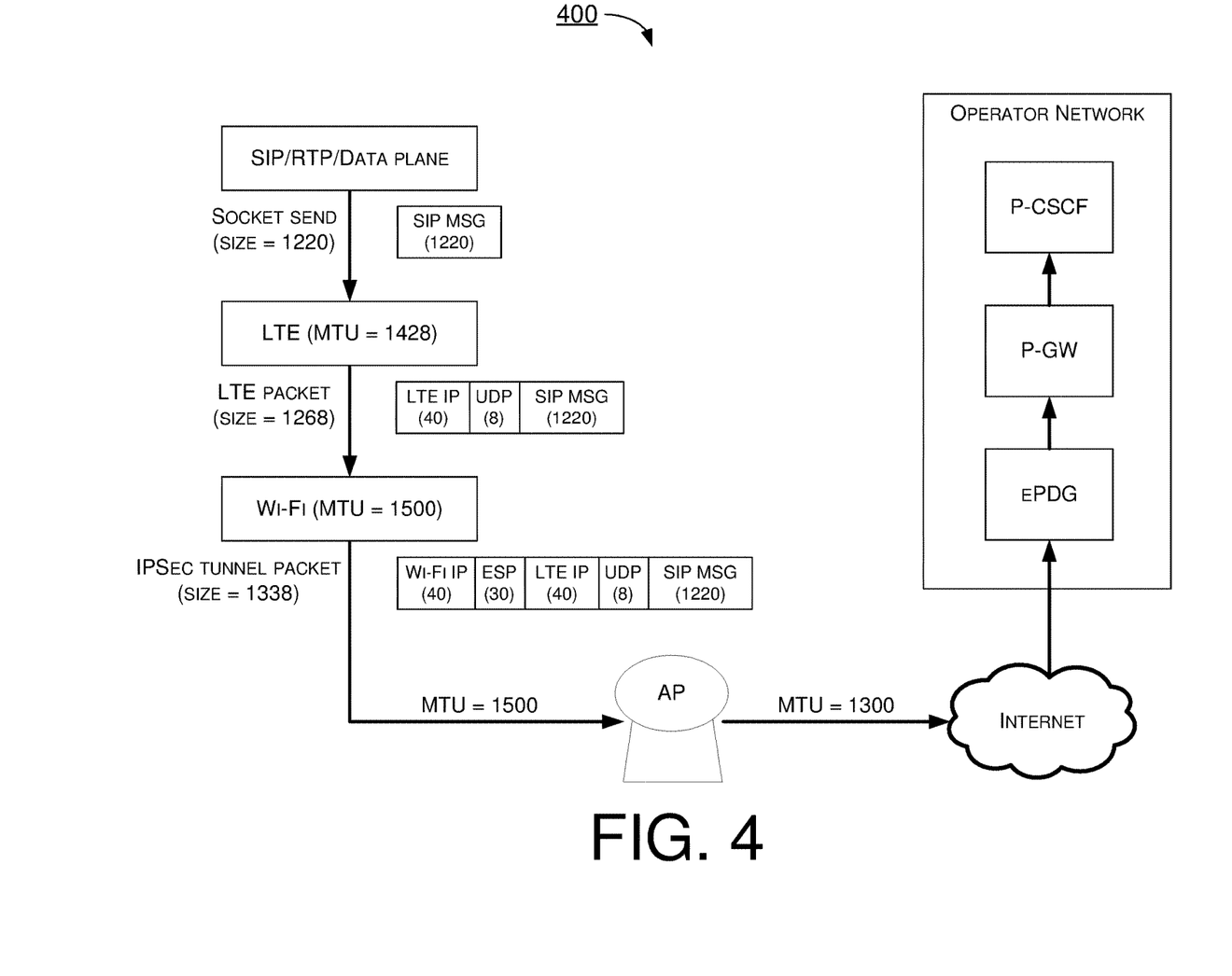
FIG. 4 is a diagram depicting an example structure under schemes in accordance with implementations of the present disclosure.

FIG. 4 illustrates an example structure 400 under schemes in accordance with implementations of the present disclosure. Structure 400 involves a UE or UA and a plurality of nodes, which may be a part of a communication network. The UE may be able to wirelessly communicate with a communication network. The communication network may comprise a plurality of nodes such as, for example and without limitation, an AP, an evolved packet data gateway (ePDG), a packet data network gateway (P-GW) and a proxy-call session control function (P-CSCF).

The UE may comprise a SIP, a real-time transport protocol (RTP) or a data plane application. The UE may send the signaling packet or the data packet on the LTE IP socket. The UE may further comprise an LTE network interface and a Wi-Fi network interface. The UE may be configured to transmit a message (e.g., SIP message) through the LTE network interface and the Wi-Fi network interface sequentially by using the IPSec tunnel mode. In the LTE protocol layer, an IP header (e.g., LTE IP header) and a transport protocol heard (e.g., UDP header) may be added to the packet. In the Wi-Fi protocol layer, an IP header (e.g., LTE IP header) and a security header (e.g., ESP header) may further be added to the packet.

The UE may be configured to determine whether the final IPSec tunnel packet size is greater than the path MTU of the Wi-Fi network interface. In a case that the final packet size is small than the path MTU of the Wi-Fi network interface, the UE may transmit the packet as a single IP packet. In a case that the final packet size is greater than the path MTU of the Wi-Fi network interface, the UE may fragment and transmit the packet as two or more IP fragments.

The AP may not support IP fragmentation. For example, the AP may not perform IP fragmentation. In a case that the received packet size is greater than the path MTU between the AP and the next node, the AP may directly drop the packet. In another example, the AP may not support delivery of IP fragments. In a case that the AP receives the IP fragments, the AP may drop the IP fragments. Along the transmission path, any of the network elements (e.g., ePDG, P-GW or P-CSCF) may also not support IP fragmentation. The network element may drop the packet due to no support for IP fragmentation or no support for delivery of IP fragments. Since the UE may continuously use the same Wi-Fi network interface, the re-transmitted IP packets or SIP messages may be dropped again.

Figure 5:
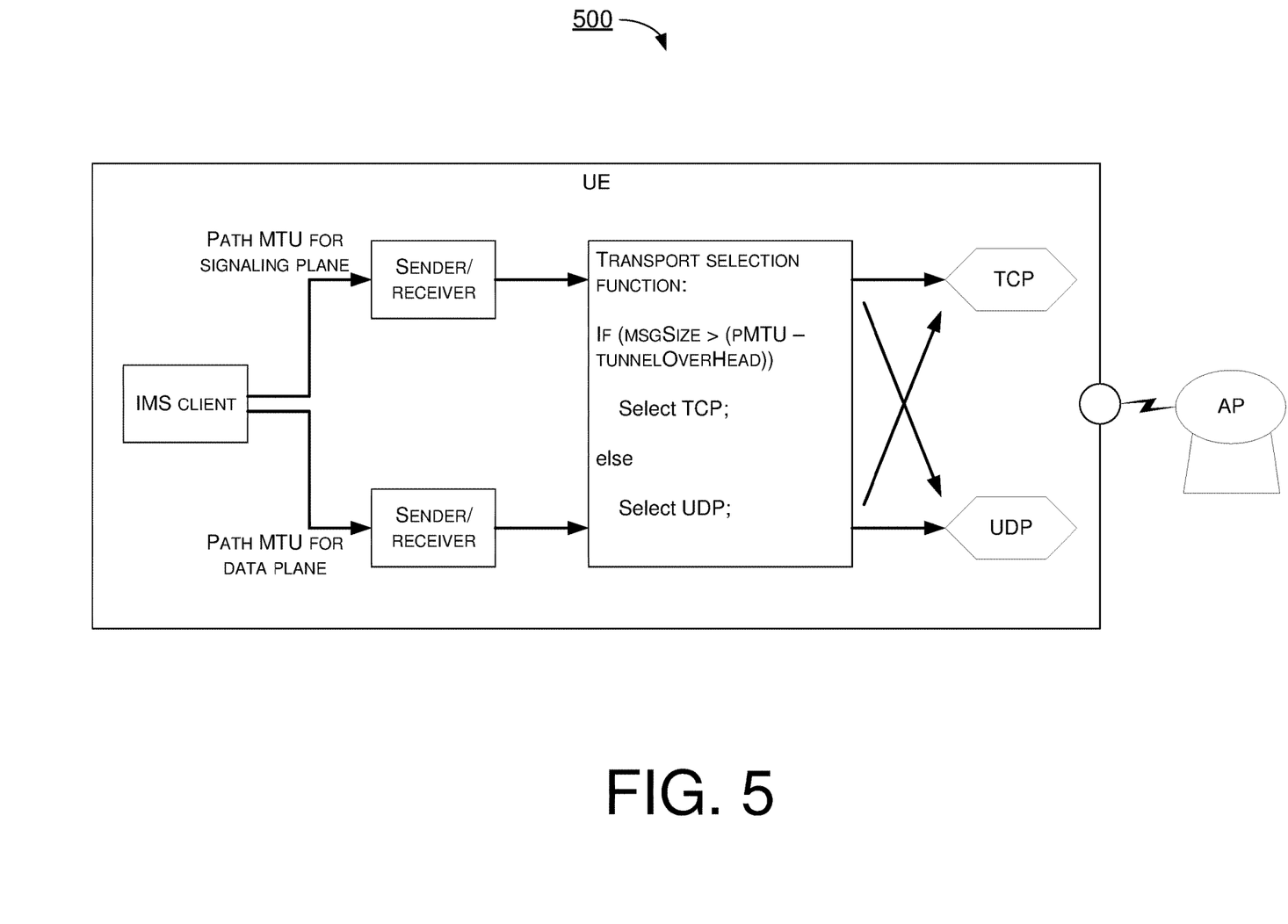
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE or UA and a plurality of nodes, which may be a part of a communication network. The UE may be able to wirelessly communicate with a communication network. The communication network may comprise a 3GPP network (e.g., LTE network) and/or a non-3GPP network (e.g., Wi-Fi network). The UE may be configured to establish a session with the communication network. The session may comprise a plurality of data paths and a plurality of MTU configurations corresponding to each data path. The plurality of data paths may comprise a signaling path and a data transmission path. The UE may be configured to transmit a packet (e.g., SIP message) on the session through a plurality of network interfaces sequentially. The plurality of network interfaces may comprise a first network interface (e.g., LTE interface) and a second network interface (e.g., WLAN interface).

The UE may be configured to select a transport protocol to generate the packet according to the MTU configuration of the data path and the overhead size. The transport protocol may comprise, for example and without limitation, a TCP, a UDP or a stream control transmission protocol (SCTP). For example, in a case that the UE is configured to transmit the packet via the first network interface (e.g., LTE interface), the UE may determine or identify a first MTU configuration of the session via the first network interface. The UE may further determine the overhead size over the first network interface. The overhead may comprise an LTE IP header and a transport protocol header (e.g., TCP/UDP header). The UE may select the TCP or UDP according to the path MTU of the LTE interface and the overhead size. For example, in a case that the message size is greater than a threshold size (e.g., decreasing the overhead size from the path MTU of the LTE interface), the UE may select the TCP. Otherwise, the UE may select the UDP.

Alternatively, in a case that the UE is configured to transmit the packet via the first network interface (e.g., LTE interface) and the second network interface (e.g., WLAN interface) sequentially by using the IPsec tunnel mode, the UE may be configured to determine or identify a second MTU configuration of the session via the second network interface. The UE may be configured to select a transport protocol to generate the packet according to the MTU configuration of the second network interface and the IPsec tunnel overhead size. The UE may be further configured to determine the tunnel overhead size between the second network interface and the first network interface since the final packet may further comprise the IPSec tunnel overhead. The IPSec tunnel overhead may comprise a WLAN IP header (e.g., Wi-Fi IP header) and a security header (e.g., ESP header). The UE may be configured to select the TCP or UDP according to the path MTU of the WLAN interface and the IPSec tunnel overhead size. For example, in a case that the message size is greater than a threshold size (e.g., decreasing the IPSec tunnel overhead size from the path MTU of the WLAN interface), the UE may select the TCP. Otherwise, the UE may select the UDP. After selecting the transport protocol and generating the packet, the UE may be configured to transmit the packet via the WLAN interface.

Accordingly, when selecting the transport protocol, the UE may be able to take the IPSec tunnel overhead into account, and may determine according to the MTU configuration of the WLAN interface. The UE may be able to select proper transport protocol by considering the possible tunnel overhead which may be added along the tunnel protocols to avoid packet fragmentation. Since the unnecessary packet fragmentation is avoided or reduced, the call drop rate may be reduced, and the user experience may also be improved.

In some implementation, the UE may determine or set the second MTU configuration by adding a new configuration to the session or modifying an existing configuration of the session statically or dynamically. The second MTU configuration may be indicated by the network or determined by the UE itself. The path MTU of the second network interface may be determined according to the path MTU of the first network interface and the tunnel overhead size. For example, the path MTU of Wi-Fi interface may equal to the path MTU of LTE interface plus the tunnel overhead size. Alternative, the path MTU of Wi-Fi interface may equal to the path MTU of LTE interface plus a buffer size or a predetermined size. Contrary, the path MTU of the first network interface may also be determined according to the path MTU of the second network interface and the tunnel overhead size.

In some implementation, as shown in FIG. 5, the UE may comprise an IP Multimedia Subsystem (IMS) client. The IMS client may establish two data paths including a signaling plan path and a data plane path with the WLAN network (e.g., AP). Each data path may have a corresponding sender and/or receiver. The UE may comprise a transport selection function to determine the transport protocol type for transmitting the packets. The transport selection function may comprise a selection rule to select either the TCP or the UDP. For example, the UE may be configured to determine whether msgSize is greater than pMTU—tunnelOverHead. The msgSize may represent the actual message size of the signaling message or the data message. The pMTU may represent the path MTU of the signaling plane or the data plane. The tunnelOverHead may represent the additional bytes added for the tunnel protocol (e.g., outer IP header, encryption header or checksum header). The tunnelOverHead may be a fixed value and may be determined during IPSec tunnel creation. The UE may be configured to decrease the IPSec tunnel overhead from the path MTU of the non-3GPP network access for each unique destination IP address. Such decrement may be performed before applying the transport protocol selection.

In some implementation, the session may comprise a plurality of network interfaces. The UE may be configured to determine a plurality of MTU configurations of the session via the plurality of network interfaces. The UE may be configured to determine the overall tunnel overhead size among the plurality of network interfaces. The overall tunnel overhead size may comprise at least one of an IPsec overhead size, a generic routing encapsulation (GRE) overhead size or a tunneling protocol overhead size. The UE may be configured to select the transport protocol to generate the packet according to the plurality of MTU configurations (e.g., the last MUT configuration) and the overall tunnel overhead size. For example, in a case that the message size is greater than a threshold size (e.g., decreasing the overall IPSec tunnel overhead size from the path MTU of the last network interface), the UE may select the TCP. Otherwise, the UE may select the UDP. After selecting the transport protocol and generating the packet, the UE may be configured to transmit the packet via the last network interface.

Illustrative Implementations

Figure 6:
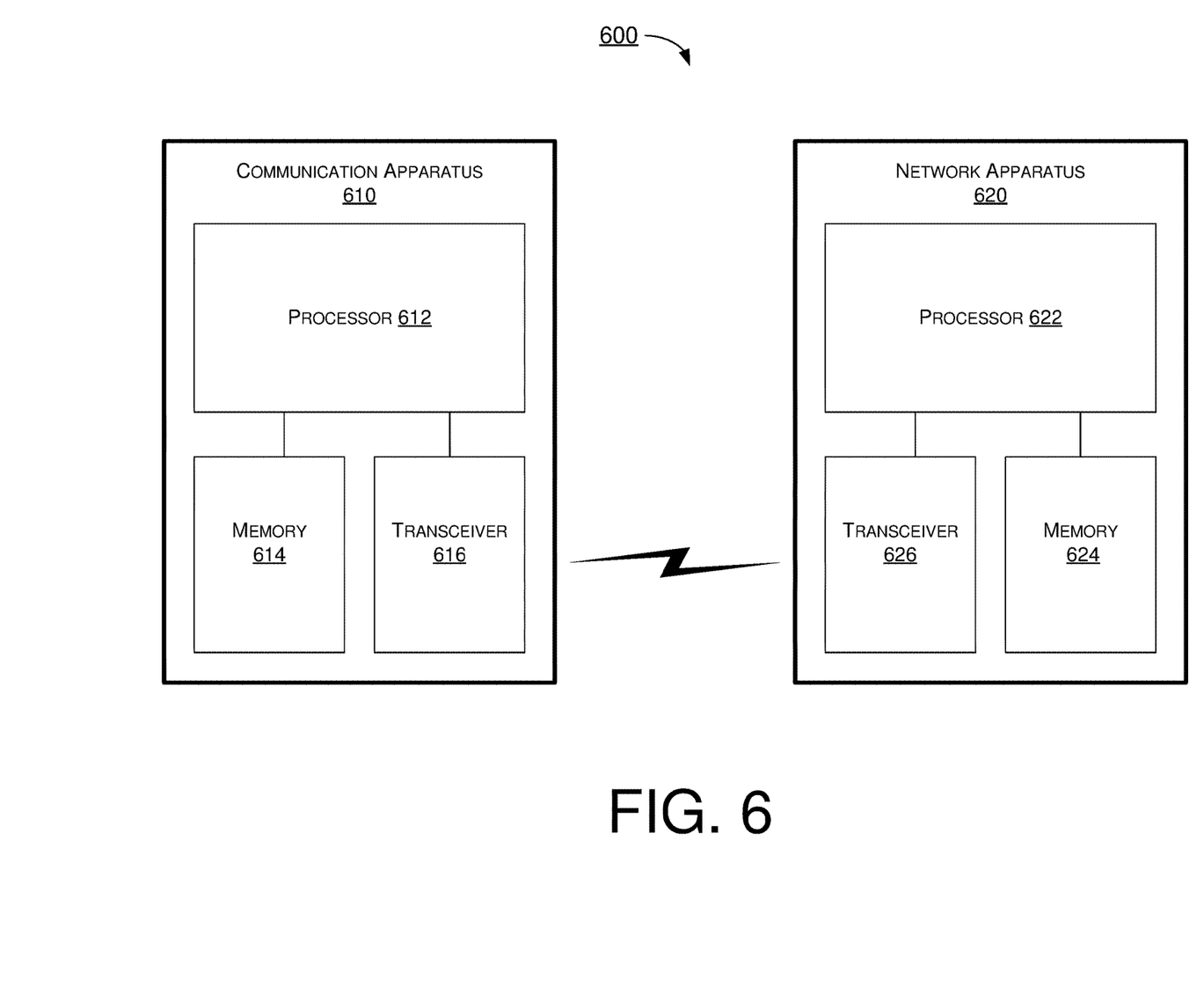
FIG. 6 is a block diagram of an example communication apparatus and an example network apparatus in accordance with an implementation of the present disclosure.
Figure 7:
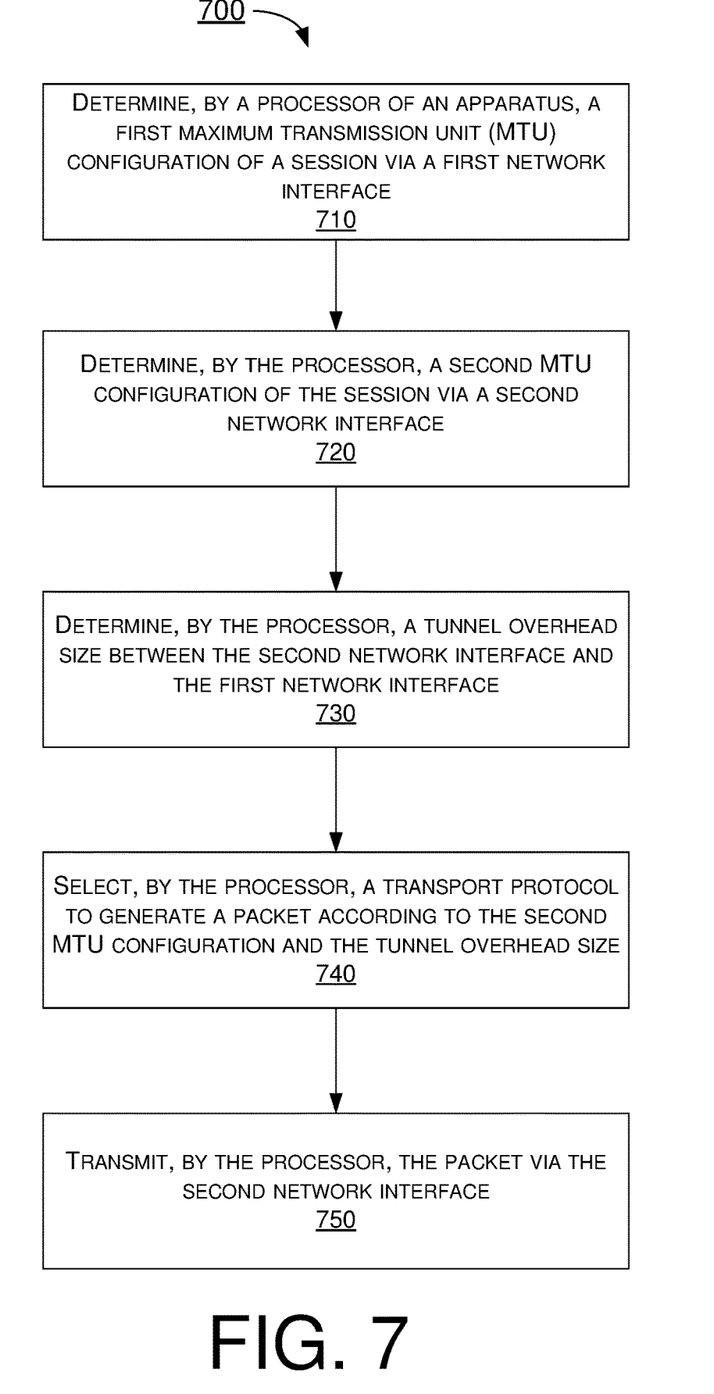
FIG. 7 is a flowchart of an example process in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to avoiding packet fragmentation with respect to user equipment and network apparatus in wireless communications, including scenarios 100, 200, 300 and 500 described above as well as process 700 described below.

Communication apparatus 610 may be a part of an electronic apparatus, which may be a UE or UA such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT or NB-IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as an AP, a base station, a small cell, a router or a gateway. For instance, network apparatus 620 may be implemented in an AP in a Wi-Fi network, an eNodeB in an LTE, LTE-Advanced or LTE-Advanced Pro network or in a gNB in a 5G, NR, Iot or NB-IoT network. Alternatively, network apparatus 620 may be implemented in the form of one or more IC chips such as, for example and without limitation, one or more single-core processors, one or more multi-core processors, or one or more CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may be able to wirelessly communicate, via transceiver 616, with network apparatus 620. Network apparatus 620 may be a network node of a non-3GPP network (e.g., Wi-Fi network). Processor 612 may be configured to establish a session with network apparatus 620. The session may comprise a plurality of data paths and a plurality of MTU configurations corresponding to each data path. The plurality of data paths may comprise a signaling path and a data transmission path.

Processor 612 may be configured to transmit a packet (e.g., SIP message) on the session through a plurality of network interfaces sequentially. The plurality of network interfaces may comprise a first network interface (e.g., LTE interface) and a second network interface (e.g., WLAN interface).

In some implementations, processor 612 may be configured to select a transport protocol to generate the packet according to the MTU configuration of the data path and the overhead size. For example, in a case that processor 612 is configured to transmit the packet via the first network interface (e.g., LTE interface), processor 612 may determine or identify a first MTU configuration of the session via the first network interface. Processor 612 may further determine the overhead size over the first network interface. The overhead may comprise an LTE IP header and a transport protocol header (e.g., TCP/UDP header). Processor 612 may select the TCP or UDP according to the path MTU of the LTE interface and the overhead size. For example, in a case that the message size is greater than a threshold size (e.g., decreasing the overhead size from the path MTU of the LTE interface), processor 612 may select the TCP. Otherwise, processor 612 may select the UDP.

In some implementations, processor 612 may be configured to transmit the packet via the first network interface (e.g., LTE interface) and the second network interface (e.g., WLAN interface) sequentially by using the IPsec tunnel mode, processor 612 may be configured to determine or identify a second MTU configuration of the session via the second network interface. Processor 612 may be configured to select a transport protocol to generate the packet according to the MTU configuration of the second network interface and the IPsec tunnel overhead size. Processor 612 may be further configured to determine the tunnel overhead size between the second network interface and the first network interface since the final packet may further comprise the IPSec tunnel overhead. The IPSec tunnel overhead may comprise a WLAN IP header (e.g., Wi-Fi IP header) and a security header (e.g., ESP header). Processor 612 may be configured to select the TCP or UDP according to the path MTU of the WLAN interface and the IPSec tunnel overhead size. For example, in a case that the message size is greater than a threshold size (e.g., decreasing the IPSec tunnel overhead size from the path MTU of the WLAN interface), processor 612 may select the TCP. Otherwise, processor 612 may select the UDP. After selecting the transport protocol and generating the packet, processor 612 may be configured to transmit the packet via the WLAN interface.

In some implementations, processor 612 may determine or set the second MTU configuration by adding a new configuration to the session or modifying an existing configuration of the session statically or dynamically. Processor 612 may receive the second MTU configuration from the network, or may determine the second MTU configuration by itself. Processor 612 may determine the path MTU of the second network interface according to the path MTU of the first network interface and the tunnel overhead size. For example, the path MTU of Wi-Fi interface may equal to the path MTU of LTE interface plus the tunnel overhead size. Alternative, the path MTU of Wi-Fi interface may equal to the path MTU of LTE interface plus a buffer size or a predetermined size. Contrary, processor 612 may determine the path MTU of the first network interface according to the path MTU of the second network interface and the tunnel overhead size.

In some implementations, processor 612 may comprise an IMS client. The IMS client may establish two data paths including a signaling plan path and a data plane path with the WLAN network (e.g., AP). Communication apparatus 610 may comprise a corresponding sender and/or receiver for each data path. Processor 612 may comprise a transport selection function to determine the transport protocol type for transmitting the packets. The transport selection function may comprise a selection rule to select either the TCP or the UDP. For example, processor 612 may be configured to determine whether msgSize is greater than pMTU—tunnelOverHead. The msgSize may represent the actual message size of the signaling message or the data message. The pMTU may represent the path MTU of the signaling plane or the data plane. The tunnelOverHead may represent the additional bytes added for the tunnel protocol (e.g., outer IP header, encryption header or checksum header). The tunnelOverHead may be a fixed value and may be determined during IPSec tunnel creation. Processor 612 may be configured to decrease the IPSec tunnel overhead from the path MTU of the non-3GPP network access for each unique destination IP address. Processor 612 may perform the decrement before applying the transport protocol selection.

In some implementation, the session may comprise a plurality of network interfaces. Processor 612 may be configured to determine a plurality of MTU configurations of the session via the plurality of network interfaces. Processor 612 may be configured to determine the overall tunnel overhead size among the plurality of network interfaces. Processor 612 may be configured to select the transport protocol to generate the packet according to the plurality of MTU configurations (e.g., the last MUT configuration) and the overall tunnel overhead size. For example, in a case that the message size is greater than a threshold size (e.g., decreasing the overall IPSec tunnel overhead size from the path MTU of the last network interface), processor 612 may select the TCP. Otherwise, processor 612 may select the UDP. After selecting the transport protocol and generating the packet, processor 612 may be configured to transmit the packet via the last network interface.

Illustrative Processes

FIG. 7 illustrates an example process 700 in accordance with an implementation of the present disclosure. Process 700 may be an example implementation of scenario 500, whether partially or completely, with respect to avoiding packet fragmentation in accordance with the present disclosure. Process 700 may represent an aspect of implementation of features of communication apparatus 610. Process 700 may include one or more operations, actions, or functions as illustrated by one or more of blocks 710, 720, 730, 740 and 750. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of apparatus 610 determining a first MTU configuration of a session via a first network interface. Process 700 may proceed from 710 to 720.

At 720, process 700 may involve processor 612 determining a second MTU configuration of the session via a second network interface. Process 700 may proceed from 720 to 730.

At 730, process 700 may involve processor 612 determining a tunnel overhead size between the second network interface and the first network interface. Process 700 may proceed from 730 to 740.

At 740, process 700 may involve processor 612 selecting a transport protocol to generate a packet according to the second MTU configuration and the tunnel overhead size. Process 700 may proceed from 740 to 750.

At 750, process 700 may involve processor 612 transmitting the packet via the second network interface.

In some implementations, process 700 may involve processor 612 decreasing the tunnel overhead size from the second MTU configuration when selecting the transport protocol.

In some implementations, process 700 may involve processor 612 adding a new configuration to the session or modifying an existing configuration of the session in determining the second MTU configuration.

In some implementations, the session may comprise a plurality of data paths and a plurality of MTU configurations corresponding to each data path. The plurality of data paths may comprise a signaling path and a data transmission path.

In some implementations, process 700 may involve processor 612 transmitting the packet through the first network interface and the second network interface sequentially.

In some implementations, the transport protocol may comprise a TCP, a UDP or a SCTP.

In some implementations, process 700 may involve processor 612 determining a plurality of MTU configurations of the session via a plurality of network interfaces. Process 700 may also involve processor 612 determining the tunnel overhead size among the plurality of network interfaces. Process 700 may further involve processor 612 selecting the transport protocol to generate the packet according to the plurality of MTU configurations and the tunnel overhead size. Process 700 may further involve processor 612 transmitting the packet via the plurality of network interfaces.

In some implementations, the tunnel overhead size may comprise at least one of an IPsec overhead size, a GRE overhead size or a tunneling protocol overhead size.

In some implementations, the first network interface may comprise an LTE interface. The second network interface may comprise a WLAN interface.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of an apparatus, a first maximum transmission unit (MTU) configuration of a session via a first network interface;

determining, by the processor, a second MTU configuration of the session via a second network interface;

determining, by the processor, a tunnel overhead size between the second network interface and the first network interface;

selecting, by the processor, a transport protocol to generate a packet according to the second MTU configuration and the tunnel overhead size; and transmitting, by the processor, the packet via the first network interface and the second network interface sequentially, wherein the first network interface is associated with a first radio access technology and the second network interface is associated with a second radio access technology different from the first radio access technology.

2. The method of claim 1, further comprising:

decreasing, by the processor, the tunnel overhead size from the second MTU configuration when selecting the transport protocol.

3. The method of claim 1, wherein the determining of the second MTU configuration comprises adding a new configuration to the session, or modifying an existing configuration of the session.

4. The method of claim 1, wherein the session comprises a plurality of data paths and a plurality of MTU configurations corresponding to each data path.

5. The method of claim 4, wherein the plurality of data paths comprise a signaling path and a data transmission path.

6. The method of claim 1, wherein the transmitting comprises transmitting the packet through the first network interface and the second network interface sequentially.

7. The method of claim 1, wherein the transport protocol comprises a transmission control protocol (TCP), a user datagram protocol (UDP), or a stream control transmission protocol (SCTP).

8. The method of claim 1, further comprising:

determining, by the processor, a plurality of MTU configurations of the session via a plurality of network interfaces;

determining, by the processor, the tunnel overhead size among the plurality of network interfaces;

selecting, by the processor, the transport protocol to generate the packet according to the plurality of MTU configurations and the tunnel overhead size; and transmitting, by the processor, the packet via the plurality of network interfaces.

9. The method of claim 1, wherein the tunnel overhead size comprises at least one of an internet protocol security (IPsec) overhead size, a generic routing encapsulation (GRE) overhead size, or a tunneling protocol overhead size.

10. The method of claim 1, wherein the first network interface comprises a Long-Term Evolution (LTE) interface, and wherein the second network interface comprises a wireless local area network (WLAN) interface.

11. An apparatus, comprising:

a transceiver capable of wirelessly communicating with a plurality of nodes of a wireless network; and a processor communicatively coupled to the transceiver, the processor capable of:

determining a first maximum transmission unit (MTU) configuration of a session via a first network interface;

determining a second MTU configuration of the session via a second network interface;

determining a tunnel overhead size between the second network interface and the first network interface;

selecting a transport protocol to generate a packet according to the second MTU configuration and the tunnel overhead size; and transmitting, via the transceiver, the packet via the first network interface and the second network interface sequentially, wherein the first network interface is associated with a first radio access technology and the second network interface is associated with a second radio access technology different from the first radio access technology.

12. The apparatus of claim 11, wherein the processor is further capable of:

decreasing the tunnel overhead size from the second MTU configuration when selecting the transport protocol.

13. The apparatus of claim 11, wherein, in the determining the second MTU configuration, the processor is further capable of adding a new configuration to the session, or modifying an existing configuration of the session.

14. The apparatus of claim 11, wherein the session comprises a plurality of data paths and a plurality of MTU configurations corresponding to each data path.

15. The apparatus of claim 14, wherein the plurality of data paths comprise a signaling path and a data transmission path.

16. The apparatus of claim 11, wherein, in the transmitting, the processor is further capable of transmitting the packet through the first network interface and the second network interface sequentially.

17. The apparatus of claim 11, wherein the transport protocol comprises a transmission control protocol (TCP), a user datagram protocol (UDP), or a stream control transmission protocol (SCTP).

18. The apparatus of claim 11, wherein the processor is further capable of:

determining a plurality of MTU configurations of the session via a plurality of network interfaces;

determining the tunnel overhead size among the plurality of network interfaces;

selecting the transport protocol to generate the packet according to the plurality of MTU configurations and the tunnel overhead size; and transmitting the packet via the plurality of network interfaces.

19. The apparatus of claim 11, wherein the tunnel overhead size comprises at least one of an internet protocol security (IPsec) overhead size, a generic routing encapsulation (GRE) overhead size, or a tunneling protocol overhead size.

20. The apparatus of claim 11, wherein the first network interface comprises a Long-Term Evolution (LTE) interface, and wherein the second network interface comprises a wireless local area network (WLAN) interface.

* * * * *